US010139480B2

(12) United States Patent
Liu

(10) Patent No.: US 10,139,480 B2
(45) Date of Patent: Nov. 27, 2018

(54) ULTRASOUND TRANSDUCER WITH DATA COMPRESSION

(71) Applicant: FUJIFILM SonoSite, Inc., Bothell, WA (US)

(72) Inventor: Kai Wen Liu, Richmond Hill (CA)

(73) Assignee: FUJIFILM SonoSite, Inc., Bothell, WA (US)

( * ) Notice: Subject to any disclaimer, the term of this patent is extended or adjusted under 35 U.S.C. 154(b) by 220 days.

(21) Appl. No.: 15/048,944

(22) Filed: Feb. 19, 2016

(65) Prior Publication Data

US 2017/0242112 A1    Aug. 24, 2017

(51) Int. Cl.
G01S 7/52         (2006.01)

(52) U.S. Cl.
CPC ........ G01S 7/5208 (2013.01); G01S 7/52034 (2013.01)

(58) Field of Classification Search
None
See application file for complete search history.

(56) References Cited

U.S. PATENT DOCUMENTS

| 5,973,629 A * | 10/1999 | Fujii ........................ G10L 19/04 341/143 |
| 2003/0115050 A1* | 6/2003 | Chen ...................... G10L 19/002 704/230 |
| 2008/0018502 A1* | 1/2008 | Wegener .................. H03M 7/30 341/50 |
| 2009/0267825 A1* | 10/2009 | Vetro ....................... G01S 7/003 342/25 R |
| 2010/0305449 A1* | 12/2010 | Wegener ................ A61B 8/483 600/459 |
| 2013/0071038 A1* | 3/2013 | Kondo ..................... G06L 9/004 382/238 |
| 2013/0301890 A1* | 11/2013 | Kaempfer ............ H04N 19/172 382/131 |
| 2015/0139305 A1* | 5/2015 | Sato ..................... H04N 19/176 375/240.03 |

* cited by examiner

Primary Examiner — Hovhannes Baghdasaryan
(74) Attorney, Agent, or Firm — Perkins Coie LLP

(57) ABSTRACT

A transducer for an ultrasound imaging system includes an array of transducer elements and an analog-to-digital converter configured to convert analog signals produced by the transducer elements into corresponding digital samples that are encoded with a first number of bits. One or more memories are used to store digital samples associated with frames of ultrasound data. A processor or logic circuit in the transducer is configured to compress the digital ultrasound data by calculating differences between the samples and encoding the differences with a second number of bits that is less than the first number of bits. In addition, the logic circuit is configured to transmit a packet that includes the differences encoded with the second number of bits and an overflow portion that encodes the differences that are too large to be encoded with the second number of bits.

18 Claims, 8 Drawing Sheets

Encoded Data packet:

230 ↘
B"11011111-00001000-00001101-10000111" B"1101110-11011010-00101000-00011101"
↖ 232
Header-Sign bits (second frame sign bits followed by diff sign bits):
Header-Encode bits: B"0011"

| 4<br>B"00100" | 16<br>B"10000" | 12<br>B"01100" | 80=31(OF)<br>B"11111" | 24<br>B"11000" | 36=31<br>B"11111" | 16<br>B"10000" | 8<br>B"01000" |
|---|---|---|---|---|---|---|---|
| 12<br>B"1100" | 28<br>B"11100" | 4<br>B"100" | 26<br>B"11010" | 68<br>B"1000100" | 16<br>B"10000" | 28<br>B"11100" | 56<br>B"111000" |
| 0<br>B"0" | 0<br>B"0" | 20<br>B"10100" | 68<br>B"1000100" | 12<br>B"1100" | 8<br>B"1000" | 0<br>B"0" | 16<br>B"10000" |
| 24<br>B"11000" | 16<br>B"10000" | 32<br>B"100000" | 8<br>B"100" | 20<br>B"10100" | 8<br>B"1000" | 68<br>B"1000100" | 12<br>B"1100" |

*FIG. 5B*

ULTRASOUND TRANSDUCER WITH DATA COMPRESSION

TECHNICAL FIELD

The disclosed technology relates to ultrasound imaging systems and in particular to ultrasound transducers that transmit ultrasound data to a remote processor.

BACKGROUND

In conventional ultrasound imaging, ultrasonic signals having a frequency of 1-15 MHz are transmitted from a transducer and into a region of interest. Return echo signals are detected by the transducer, converted to a digital format and analyzed with a microprocessor (CPU) or digital signal processor (DSP) to produce information about tissue structure or fluid movement in the region of interest. At these frequencies and with a frame rate of 30-60 Hz, it is not too difficult to transmit the ultrasound data from the transducer to a console or other computing system. However, as the pulse repetition frequency (PRF) of the ultrasound signals transmitted by the elements increases, the amount of ultrasound echo data that must be transmitted from the transducer to the processor increases dramatically.

One emerging field in ultrasound that is particularly affected by this data bottle neck is plane wave imaging. In most modern ultrasound imaging systems, ultrasound signals that are transmitted from, and received by, multiple transducer elements are delayed, weighted and summed to direct the transmit and receive beams in a particular direction. The time required to scan a region of interest is therefore the time required to produce and receive anywhere from several to a few hundred beam lines that cover the area. With plane wave imaging, ultrasound signals are simultaneously transmitted by each transducer element and the corresponding electronic echo signals produced by each transducer element are sampled without combining them with the signals produced by the other elements. The time required to scan a region of interest is therefore only limited by the time it takes an ultrasound signal to penetrate to a desired depth in the tissue and return to the transducer. With plane wave imaging, frame rates of 3,000-15,000 Hz are possible compared with frame rates of 30-60 Hz with conventional imaging techniques. The frame rates achievable with plane wave imaging are useful for such tasks as imaging quickly moving tissues (e.g. heart muscles of small animals) as well as for studying the effects of shear waves in tissue among other uses.

With such high PRFs, the amount of ultrasound data that must be transmitted from the transducer to one or more processors that analyze the data can exceed tens of Gigabits per second. Therefore, one limiting factor in real time, plane wave imaging is how fast the data can be transmitted from the transducer to the signal processing system that analyzes the data. Given this problem, there is a need for techniques to reduce the amount of data that is transmitted from an ultrasound transducer and/or to shorten the time required to transmit the data to the processors that analyze the data.

SUMMARY

To address the problems discussed above, the disclosed technology relates to a system and method for reducing the amount of ultrasound data to be transmitted from an ultrasound transducer to a processing unit. Data compression is performed by one or more processors or logic circuits in an ultrasound transducer to encode the differences between samples in one or more of a horizontal direction (e.g. between samples on adjacent lines), in a vertical direction (between samples at different depths on the same line) and/or temporally (e.g. between samples on the same line in different frames). In one embodiment, multiple samples are compared to determine a most common range of differences to be encoded and minimum bit length is chosen to encode the differences. A packet is created with each difference encoded in the determined bit length along with an overflow portion of the packet that is used to transmit those differences that need additional bits to represent a difference.

In one embodiment, a processor (CPU or DSP) or other logic circuit such as a field programmable gate array or ASIC analyzes data between different rows or depths in a single frame or between corresponding samples in two temporally spaced frames. A base sample in a first frame is compared to adjacent samples (horizontally or vertically) or against a sample in a corresponding position in a subsequent frame. A distribution of the differences between the samples is used to select a bit size to be used in encoding the differences. A packet is then created with an indication of how many bits are used to encode the differences between samples. In one embodiment, differences are encoded as an absolute value of the difference between the absolute values of the samples. In some embodiments, the packet includes bit patterns that indicate whether a sample is positive or negative and whether the difference is positive or negative.

BRIEF DESCRIPTION OF THE DRAWINGS

FIGS. 5A and 5B illustrate how ultrasound data is compressed and packetized in accordance with some embodiments of the disclosed technology.

DETAILED DESCRIPTION

Figure 1:
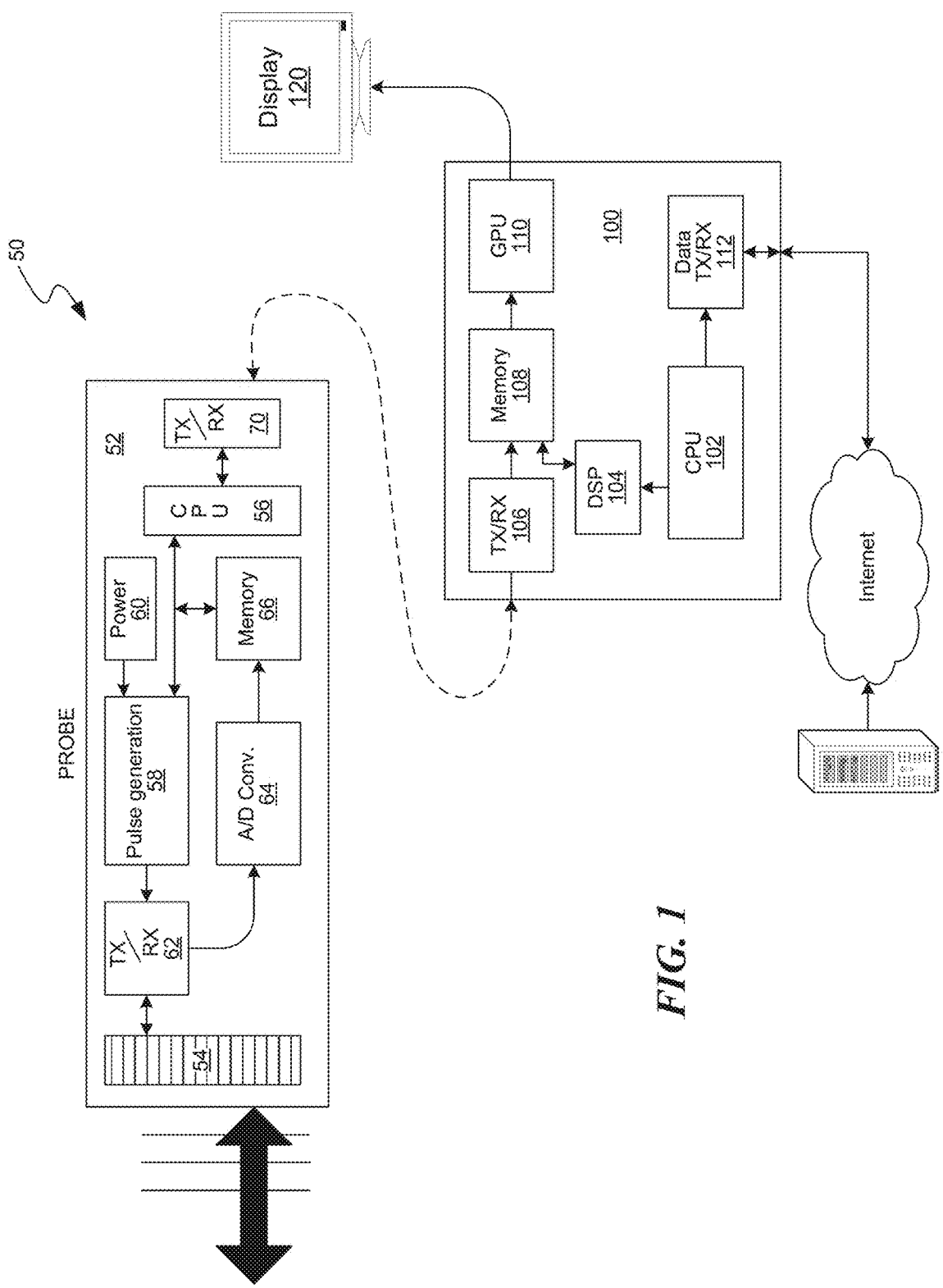
FIG. 1 shows a simplified illustration of a plane wave ultrasound imaging system in accordance with one embodiment of the disclosed technology.

The technology disclosed herein relates to systems for reducing the amount of ultrasound data and/or reducing the amount of time required to transmit ultrasound data from an ultrasound transducer to a remote processor that analyzes the data. The remote processor may be a processor (e.g. CPU, DSP, GPU or combinations thereof) in a console portion of an ultrasound machine or may be a stand-alone computer system. As shown in FIG. 1, an ultrasound imaging system 50 includes a transducer 52 that includes an array of piezoelectric transducer elements 54. A processor (CPU) 56 controls a pulse generator 58 to supply electronic signals through a transmit/receive switch 62 to the transducer elements 54. The transducer elements 54 convert the electronic signals into acoustic signals that are delivered to a region of interest. After transmission of the acoustic signals, the transmit/receive switch 62 changes states and the transducer elements are connected to receive circuitry that includes conventional signal conditioning circuitry and analog-to-digital converters 64 that digitize the received echo signals. The digitized echo signals are stored in one more memories 66. When requested or as needed, the CPU 56 reads the digitized echo signals and transmits them via a transmit/receive circuit 70 and a link (e.g. fiber-optic cable, twisted pair cable, co-axial cable, wireless such as 802.11, infrared etc.) to a remote computing system 100.

In one embodiment, the remote computing system 100 may be a cart-based or hand-held ultrasound processing system. In one embodiment, the computing system 100 includes one or more processors (e.g. CPUs) 102 and/or digital signal processors (DSP) 104 that analyze ultrasound data that is received from the transducer 52 via transmit/receive circuits 106 (e.g. optical, wireless, wired or the like) and are stored in one or more memories 108. The ultrasound data may be processed by one or more of the processors e.g. a DSP 104 and/or a graphics processing unit (GPU) 110 and displayed on a display screen 120. In addition, the processed ultrasound data may be transmitted to a remote location (e.g. a remote computer or other ultrasound system) or to a computer storage device (e.g. hard drive, optical disc or the like) via a transmit/receive circuit 112 (NIC, USB, Firewire, Thunderbolt connection or the like).

As will be appreciated by persons of ordinary skill in the ultrasound arts, the transducer 52 and the computing system 100 are shown in a simplified form and also include many additional features (e.g. power supplies, heat management etc.) that are not disclosed herein to avoid unduly obscuring the subject matter of the disclosed technology.

In some embodiments, the ultrasonic transducer 52 is configured to perform plane wave imaging whereby many or all of the transducer elements 54 transmit ultrasonic signals at substantially the same time and the electronic echo signals produced by the transducer elements are sampled simultaneously without beamforming. In this way, an entire region of interest can be imaged on multiple beamlines simultaneously. The time between pulses is therefore only limited by the time it takes the ultrasound signals to travel to a desired depth in the tissue and to return to the transducer. Pulse repetition frequencies (PRFs) of up to 15,000 Hz. and higher are possible to provide stop action image frames of quickly moving tissue and to image other phenomena.

At a PRF of 10,000 Hz., a single frame having 64 lines with 1000 samples per line and 10 bits/sample for both in-phase and quadrature (e.g. I and Q) signal components of the received signals requires a transfer data rate of 12.8 Giga bits/sec, which is faster than most commercially available interface circuits (e.g. USB 3.0 at about 5 Giga bits/sec) etc.) The data rates required become even more challenging as larger transducer arrays (e.g. 128 or 256 elements) and higher PRFs are used.

To address this problem, the disclosed technology operates to reduce the amount of data that is transmitted from the transducer 52 to the computing system 100. As will be explained in detail below, logic circuits in the transducer 52 are configured to determine differences between samples in the same frame (e.g. intra-frame differences) or between frames (inter-frame differences) and to transmit the differences as a way to reduce the amount of data that is required to create a frame.

Figure 2:
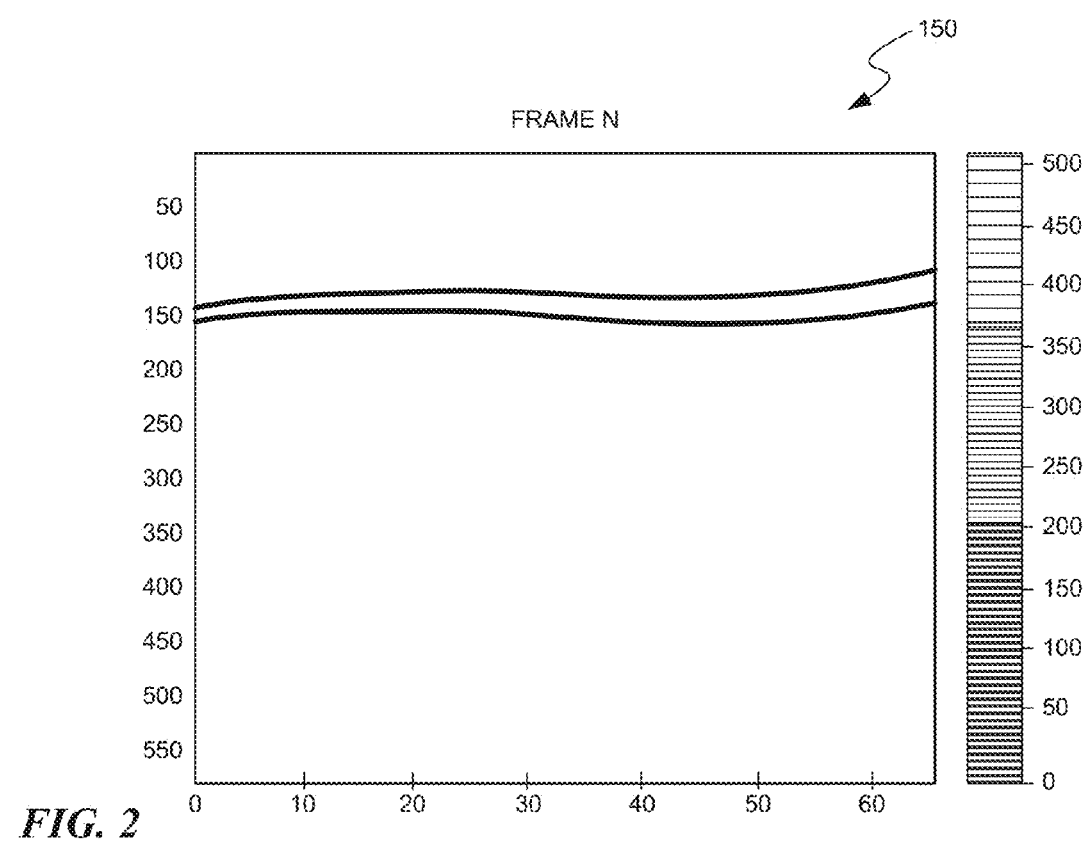
FIG. 2 illustrates a sample plane wave image frame having 64 vertical lines and 550 samples per line.

For purposes of illustration, a representative plane wave imaging frame 150 is shown in FIG. 2. The frame 150 has data from 64 channels (transducer elements) with 550 samples per channel and uses a 10 bit signed representation of echo intensity (e.g. 1 bit to indicate whether the sample is positive or negative and 9 bits to represent the sample magnitude) for each sample location. In one embodiment shown in FIG. 3, a programmed logic circuit (e.g. a CPU, FPGA or other logic circuit such as discrete logic circuit components) in the transducer operates to compress the ultrasound data prior to sending it to a remote imaging processing system. The logic circuit is configured with software or firmware to determine whether a horizontal, vertical or temporal compression should be used. In one embodiment, the type of compression selected is determined by calculating which type provides the greatest reduction in the amount of data that must be transmitted in order to create an image frame. In another embodiment, the type of compression used can be selected by the user or the type of compression can be fixed (e.g. always uses intra-frame compression or always use inter-frame compression etc.).

For purposes of illustration, temporal compression is described. However, the techniques described apply equally to horizontal or vertical intra-frame compression. In the embodiment shown, ultrasound echo data produced by the transducer elements for a frame N are digitized by A/D converters 64 and stored in a memory 182. Data for a previous frame N−1 has been previously digitized and are stored in a memory 184. The memories 182 and 184 may be part of the same physical memory or may be separate physical memory circuits. As shown, a portion of the memory 184 stores samples for channels 1-8 and sample positions 116-119 for frame N−1 (e.g. a first frame), while memory 182 stores corresponding samples for frame N (e.g. a subsequent frame). A memory 186 stores the differences between the samples. In one embodiment, differences are stored as the absolute value of the difference between the absolute values of the samples along with a bit that indicates whether the difference is positive or negative. For example, frame N for channel 2 at sample position 117 has a data value of 170 while the same sample in the previous frame N−1 has a value of 198. Therefore, a difference of 28 is stored in the memory 186 for that sample location along with a bit 190 in a string of sign bits (e.g. 1 for a negative, 0 for positive) to indicate that the difference is negative 28 (e.g. minus 28). Because a digital representation of the difference 28 can be represented using fewer bits than the number of bits required to represent the original data values of 198 and 170, the transducer transmits a packet with the difference value of 28 plus a sign bit in order to compress the data rather than transmitting the original sample values.

As indicated above, in one embodiment, the differences are stored as an absolute value of the difference in the absolute values of the samples to use even fewer bits. For example, if a sample in the previous frame N−1 is +500 and a second sample in current frame N is −500 then the actual difference between samples would be −1000 that requires 10 bits plus one sign bit to encode. However, if the absolute values are used, the difference can be encoded with the number 0 which only takes 1 bit encode (plus a sign bit as will be explained below). A packet transmitted by the transducer that encodes the difference values between the sample points is sent to the remote processor that can create the remainder of a frame or a subsequent frame based on a known starting value and the values of the differences. In one embodiment, the difference values and the bit string to indicate whether the differences are positive or negative are sent in different portions of the data packet.

Figure 3:
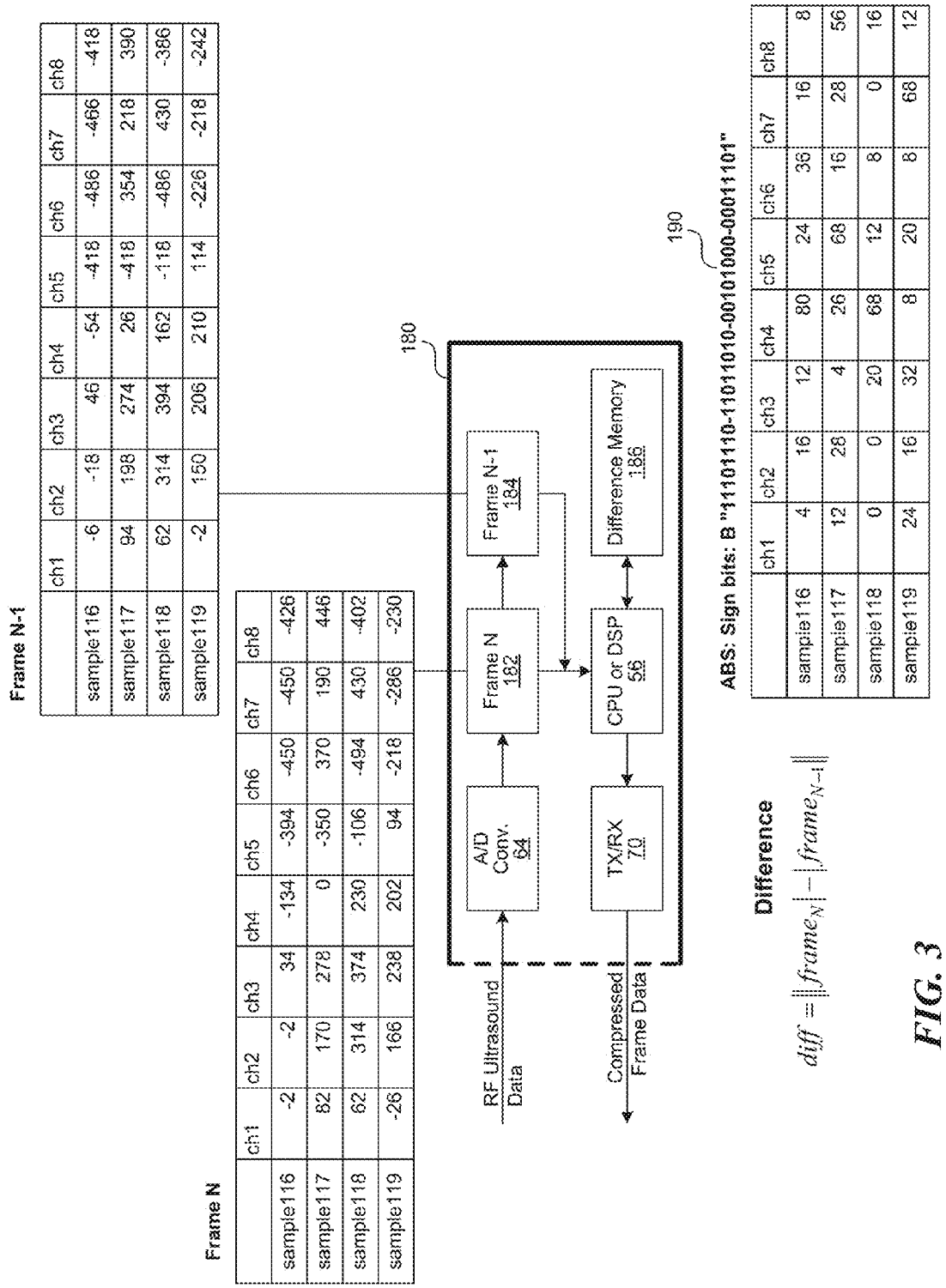
FIG. 3 illustrates processing logic in an ultrasound transducer to compress ultrasound data from a frame into a number of packets before the data is transmitted to a remote processor in accordance with one embodiment of the disclosed technology.

In the example shown in FIG. 3, the differences are computed between the same sample locations in two temporally spaced frames. However, it will be appreciated that differences can be computed between samples at the same depth on different beam lines or on the same beam line at different depths. In one embodiment, the packet that transmits the differences to the remote processor includes a bit pattern that indicates what type of encoding is to be used (horizontal, vertical or temporal). In another embodiment, the receiving processor is informed what type of encoding is used via another packet or signal or input from a user.

Figure 4:
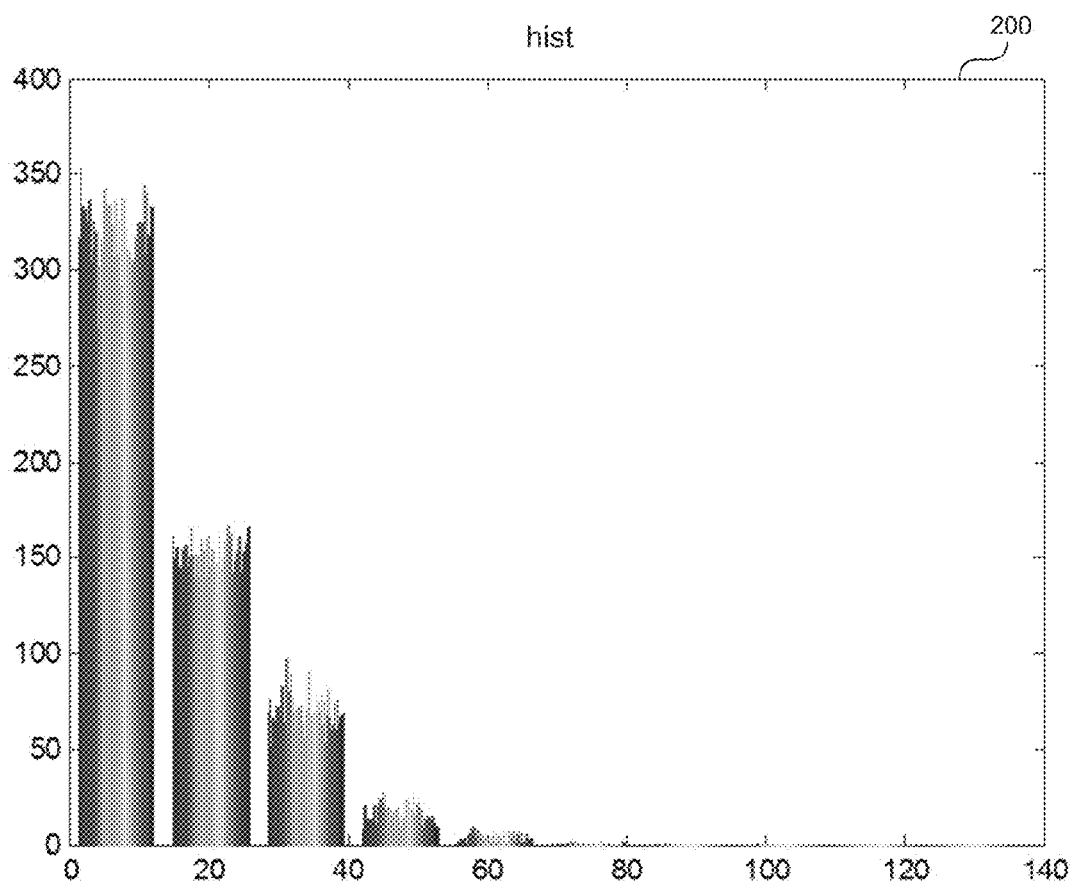
FIG. 4 illustrates a representative histogram of differences between samples in ultrasound echo data in accordance with an embodiment of the disclosed technology.

In one embodiment, once the difference values have been determined by the processor or the programmed logic in the transducer, the differences are categorized such as by creating a histogram of the difference values without regard for the sign of the differences. FIG. 4 shows one example of a histogram 200 of sample differences. As can be seen in the histogram, the majority of sample differences have a value in a range from 0-14. A smaller number of differences have values in the range from 16-24 and even fewer have a difference in the range from 26-38. In one embodiment, the most common difference values in the histogram is used to select the number of bits used to encode the differences. Because differences up to 15 can be encoded with 4 bits, the data packet encodes the individual differences with 4 bits and those differences that are greater than the value that can be represented by 4 bits are sent in an overflow portion of the packet.

Figure 5A:
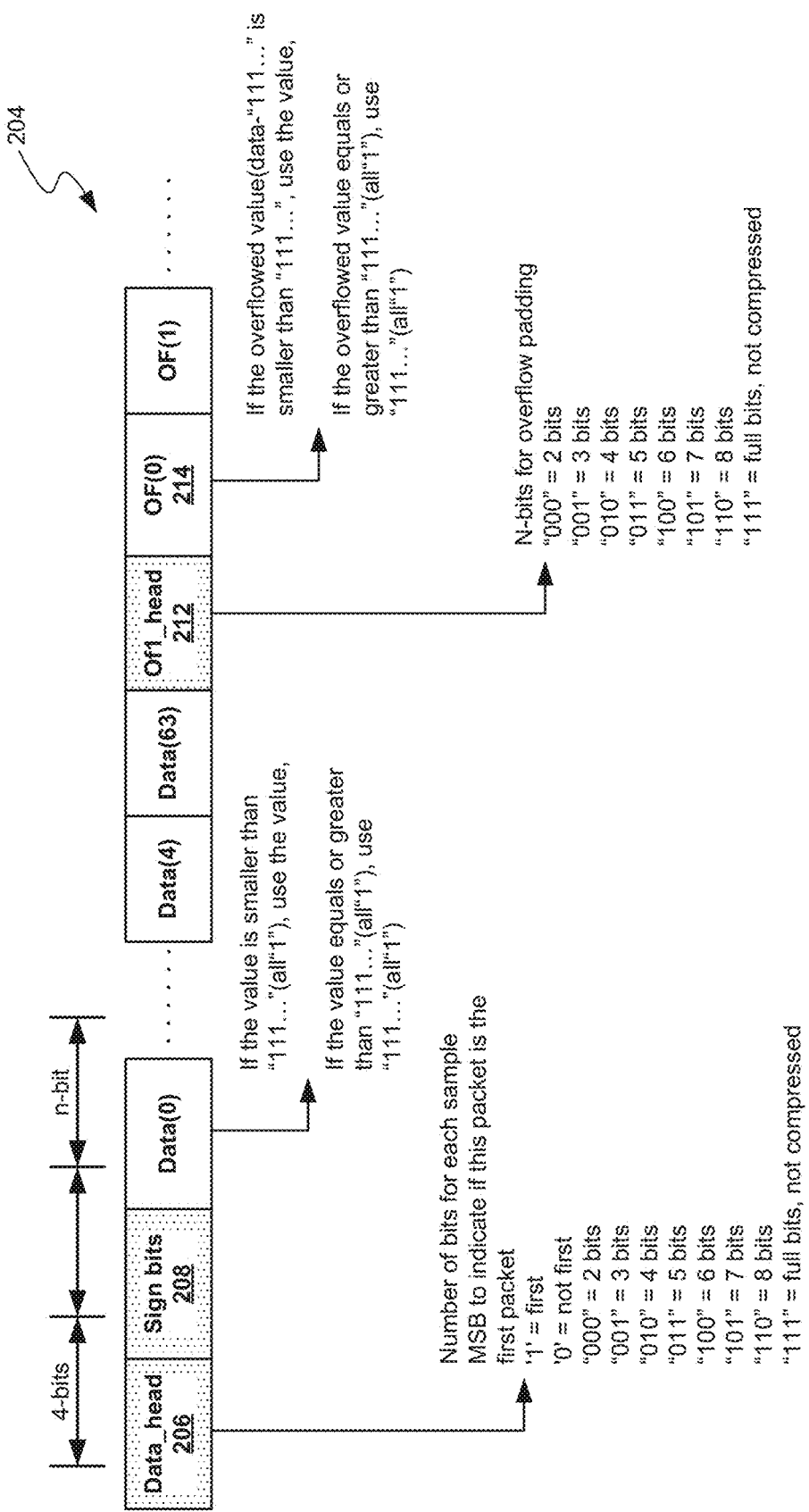

FIG. 5A illustrates a representative packet used to transmit the differences in sample values from the transducer to a remote processor in accordance with one embodiment of the disclosed technology. A packet 204 includes a data head portion 206, a series of sign bits 208 that indicates whether each data sample represented by the packet is positive or negative and a number of the sample differences that are encoded with the selected numbers of bits. For the second and subsequent data packets, the series of sign bits also include a series of sign bits that indicates whether difference between the previous sample and the current sample is positive or negative as will be explained below.

In one embodiment, the data head portion 206 of the packet includes a first bit to indicate whether the particular packet is a first packet (e.g. a base sample) or is not a first packet (e.g. is a subsequent packet). Because subsequent frames (or samples in a frame) are constructed from the base sample values, the first bit in the header portion indicates whether the packet contains data for the first frame/row/col or a subsequent frame/row/col. Following the first bit in the data head portion 206 is a binary code indicating the number of bits used to encode the data. For example, "000" represents a 2-bit encoding, "001" represents a 3-bit encoding, "010" represents 4-bit encoding etc. while "111" indicates no compression or full bits. In one embodiment, full bits uses the total number of bits supplied by the A/D converter in the transducer (e.g. 9-bit encoding and 1 pos./neg. bit). However, A/D converters with a greater or a lesser numbers of bits could be used. In one embodiment, the first frame (for inter-frame differences) is sent using full bit encoding. However, for intra-frame encoding only the first row or first column may be sent with full bit encoding.

The sign bits 208 are a number of binary strings with a "0" or "1" for each data sample in the packet. In one embodiment, a 0 represents a positive sample while a 1 represents a negative sample.

Following the sign bits 208 are a number of data samples 210 encoded with the number of bits indicated in the data head portion 206. In one embodiment, all "1s" in the data portion is used to both indicate the maximum data value for the data portion and that an overflow entry in the packet will be sent that indicates the amount by which the value that can be encoded with the number of bits used is exceeded. For example, if a difference has a value of 40 and four bits are specified by the data head portion to encode the majority of difference values, then the entry for a data difference of 40 would be "1111" that indicates a value of 15 as well as indicates that there is an overflow value for the sample. The overflow portion would an entry for "11001" or 25 that is to be added to the previous portion encoded (15+25=40).

In one embodiment, the data packet includes an overflow header 212 that occurs after the last data sample that indicates the number of bits used to encode the overflow entries. In one embodiment, each overflow entry 214 may be encoded with the number of bits required to encode the largest overflow that occurs in the packet. Alternatively, a process can be used that is similar to the way in which the number of bits used to encode the data portions of the packet is selected. That is, the number of bits required to encode the majority of the overflow amounts can be determined and any further overflows can be identified by a pattern of all 1's (e.g. "111") followed by an addition overflow amount encoded with a selected number of bits.

The number of data entries in a packet is generally controlled by the operating system of the computer. For example, packets can be broken up to encode 8 samples or 64 samples etc. The software/firmware operating in both the transducer and the receiver have to agree how many samples are represented by the packet and what the samples represent.

FIG. 5B shows a number of samples encoded as the absolute values of the differences. In the example shown, any difference value that can't be encoded in 5 bits (e.g. greater than 31) requires an entry in an overflow portion of the packet. As shown, the differences values are accompanied by two sets of bit strings. A first bit string 230 contains entries for each row of the table to indicate whether the original data sample from which the difference was computed was positive or negative. A second bit string 232 contains entries for each row of the table to indicate whether the difference being encoded is positive or negative. Some of the values in the table of FIG. 5B are shown as their actual values (e.g. 68, 56, 32 etc.). However, in accordance with the disclosed embodiments, these values would be encoded as the maximum value possible with the selected number of bits (e.g. 31 or binary 11111) plus an overflow amount.

As will be appreciated, the amount of compression that occurs as a result of transmitting the packets is at least in part determined by how many bits can be saved by encoding the differences with a fewer number of bits versus transmitting the raw data. If the data samples vary little between frames/rows or columns e.g. most sample difference lie in the range of 0-15, then most of the differences can be encoded with 4 bits versus using all 9 bits to send the actual sample values in the example provided. On the other hand, if a majority of the data differences have a value that can only be encoded with 9 bits, then little if any compression will be achieved.

In one embodiment, it has been estimated that encoding the differences using a fewer number of bits rather than transmitting the actual values of the ultrasound data can achieve reductions in the amount of data that need to be transmitted by 25-30% on average. A difference of approximately 30% reduces the speed required of the transmission circuitry to carry the data from the transducer to the ultrasound processor.

As will be appreciated, in order to construct a frame of ultrasound data using the compressed data, the receiving processor is informed of one or more starting values against which the differences can be added or subtracted. In one embodiment, for temporal compression, an entire frame of uncompressed ultrasound data is transmitted to the processor to use as a starting point for computing the sample values in a subsequent frame. For inter-frame compression one or more uncompressed values are transmitted to the receiving processor for use as a starting point in computing additional sample values in the same frame from the difference values.

Figure 6A:
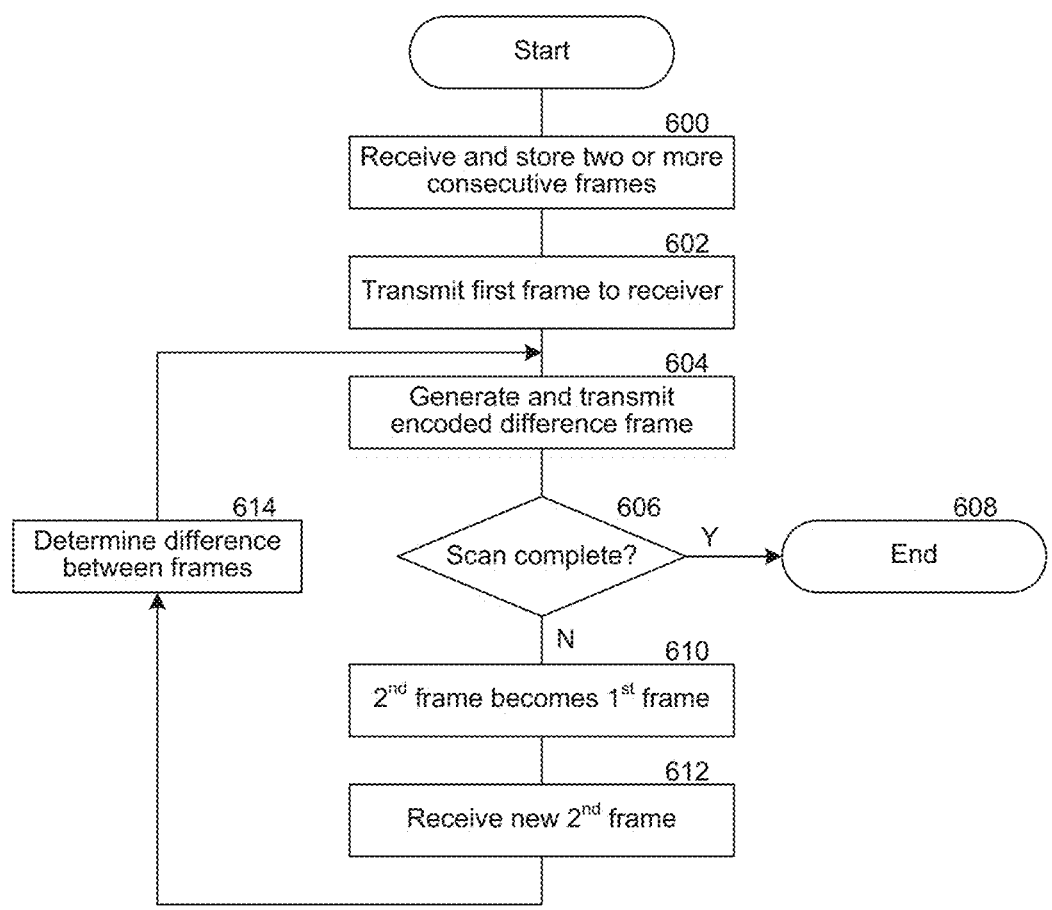
FIGS. 6A-6B are representative flow diagrams showing steps performed by a processor for compressing and decompressing ultrasound data in accordance with an embodiment of the disclosed technology.
Figure 6B:
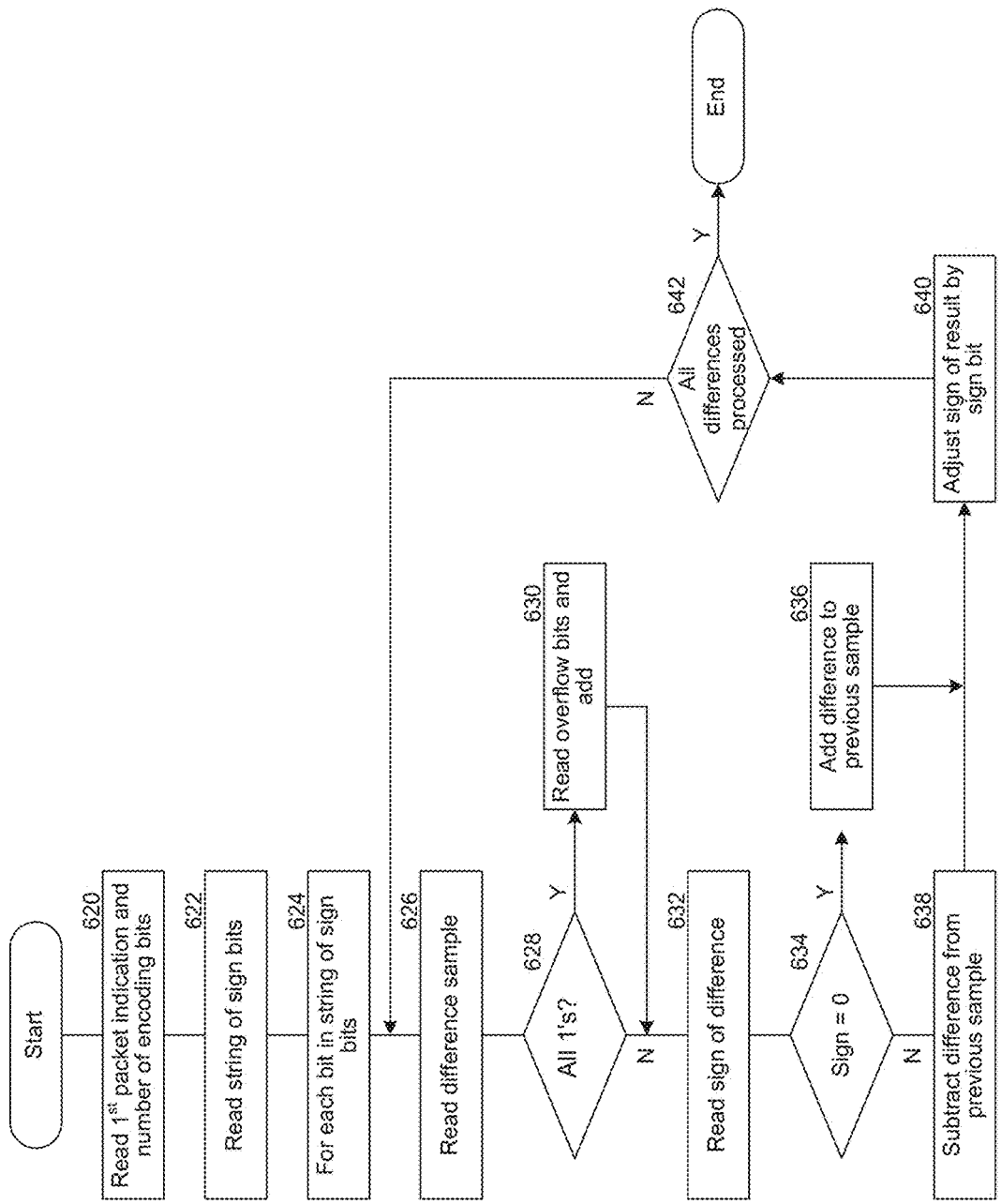

FIGS. 6A-6B are a series of flow charts showing steps performed by a processors in the transducer and the receiver to transmit and reconstruct the ultrasound data using techniques described above. In one embodiment, the steps are encoded in a computer readable memory as instructions that are executable by a processor. Although the steps are described in a particular order for ease of explanation, it will be appreciated that the steps could be performed in a different order or that different steps could be performed in order to achieve the functionality described.

Beginning at block 600, the receiving processor in the transducer receives ultrasound data for two or more successive ultrasound frames. In one embodiment, the processor in the transducer computes the differences between the various rows, columns and between frames and selects the type of compression that produces the greatest amount of data compression in order to encode the data. In one embodiment, the type of data compression (intra-frame versus inter-frame) can be indicated in the first packet that is transmitted. Alternatively, a separate code can be transmitted to the receiving processor to indicate the type of compression to be used. At 602, the data for a base column, row or frame is transmitted to the receiver. At block 604, the processor in the transducer assembles and transmits a data packet that encodes the differences from the data values transmitted as the base values.

At block 606, the processor detects if the scan is complete (e.g. no additional data being received or an operator has turned off the scan). If so, the process ends at block 608. If the scan is continuing, then the processor in the transducer makes the current frame the previous frame at block 610. The processor then receives data for a new frame at block 612 and computes the differences between the new frame and the previous frame at block 614 before returning to block 604 to transmit the differences as one or more packets.

As shown in FIG. 6B, the processor in the receiver receives a packet with data for the next frame, column or row. At block 620, the receiving processor analyzes the packet to determine if the packet is the first packet of the transmission or a subsequent packet. In addition, the data head of the packet is decoded to determine how many bits are used to encode the difference values. At block 622, the string of sign bits for the data values are read. If the packet is the first packet, then the data values are read and given the corresponding negative or positive sign (step not shown).

If the packet is the second or subsequent packet, then the receiving processor begins a loop for each bit in the string of sign bits (indicating the number of difference samples to be processed) at step 624. At block 626, the processor reads the difference value. At block 628, the processor determines if the difference values is encoded as all 1's or some other indication of an overflow condition. If so, the processor reads the corresponding overflow portion of the packet and adds it to the value that which was previously read for the difference.

At block 632, the processor reads the encoded sign of the difference value (sign bits 232 in FIG. 5B that specify whether the difference between sample N and N−1 is positive or negative) and assigns the correct sign to the difference value. If the difference is positive (bit=0 at block 634) then the processor adds the difference to the absolute value of the previous sample at block 636. If the difference is negative (bit=1 at block 634), then the difference is subtracted from the absolute value of the previous sample at block 638. At block 640, the result is encoded as a positive or negative number in accordance with the sign bit included in the packet that represents if the data value from which the difference was computed is positive or negative.

As can be seen from the above, the disclosed technology provides a simple mechanism by which programmed logic (programmed CPU, microprocessor, microcontroller, ASIC, FPGA or discrete logic) can be used to reduce the amount of data that is transmitted from an ultrasound transducer to a remote processor in an ultrasound console or a remote computer. The present technology allows plane wave ultrasound data to be transmitted over lower bandwidth communication links or in less time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The terms "processor or logic circuit" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A transducer for an ultrasound imaging system, comprising:
    an array of transducer elements;
    an analog-to-digital converter configured to convert analog signals produced by the transducer elements into corresponding digital samples encoded with a first number of bits;
    a memory for storing digital samples associated with a frame of ultrasound data; and
    a logic circuit configured to
        compress the digital ultrasound data by calculating differences between the samples and to encode the differences with a second number of bits that is less than the first number of bits; and
        transmit a packet that includes differences encoded with the second number of bits and an overflow portion that encodes the differences that are too large to be encoded with the second number of bits;
    wherein the logic circuit is configured to calculate a histogram of difference values and select the second number of bits as the smallest number of bits that will encode the most common difference values determined from the histogram and wherein the packet includes a second header that defines a number of bits used to encode the differences that are too large to be encoded with the second number of bits.

2. The transducer of claim 1, wherein the logic circuit is configured to include a header portion in the packet that defines the second number of bits used to encode the differences.

3. The transducer of claim 1, wherein the logic circuit is a microprocessor.

4. The transducer of claim 1, wherein the logic circuit is a digital signal processor.

5. The transducer of claim 1, wherein the logic circuit is a field programmable gate array.

6. The transducer of claim 1, wherein the logic circuit is a formed from discrete logic circuits.

7. The transducer of claim 1, wherein the differences are differences between rows of the same ultrasound frame.

8. The transducer of claim 1, wherein the differences are differences between different depths in a single line of the same ultrasound frame.

9. The transducer of claim 1, wherein the differences are differences between corresponding samples in different ultrasound frames.

10. A method performed by a processor in a transducer for an ultrasound imaging system, comprising:
    storing digital samples associated with frames of ultrasound data in a memory with a first number of bits;
    compressing the digital ultrasound data by calculating differences between the samples and encoding the differences with a second number of bits that is less than the first number of bits; and
    transmitting a packet that includes differences encoded with the second number of bits and an overflow portion that encodes the differences that are too large to be encoded with the second number of bits;
    wherein the packet includes a second header that defines a number of bits used to encode the differences that are too large to be encoded with the second number of bits.

11. A computer readable medium including instructions that are executable by a processor in a transducer for an ultrasound imaging system, wherein the instructions when executed cause the processor to:
    store digital samples associated with frames of ultrasound data in a memory with a first number of bits;
    compress the digital ultrasound data by calculating differences between the samples and encoding the differences with a second number of bits that is less than the first number of bits; and
    transmit a packet that includes differences encoded with the second number of bits and an overflow portion that encodes the differences that are too large to be encoded with the second number of bits;
    wherein the packet includes a second header that defines a number of bits used to encode the differences that are too large to be encoded with the second number of bits.

12. A transducer for an ultrasound imaging system, comprising:
an array of transducer elements;
an analog-to-digital converter configured to convert analog signals produced by the transducer elements into corresponding digital samples encoded with a first number of bits;
a memory for storing digital samples associated with a frame of ultrasound data; and
a logic circuit configured to
compress the digital ultrasound data by calculating differences between the samples and to encode the differences with a second number of bits that is less than the first number of bits; and
transmit a packet that includes differences encoded with the second number of bits, a header portion in the packet that defines the second number of bits used to encode the differences and an overflow portion that encodes the differences that are too large to be encoded with the second number of bits;
wherein the logic circuit is configured to include a second header in the packet that defines a number of bits used to encode the differences that are too large to be encoded with the second number of bits.

13. An ultrasound imaging system comprising:
a transducer configured to transmit ultrasound signals into a region of interest and to receive echo signals from the region of interest;
one or more analog to digital converters configured to convert the received echo signals into corresponding digital samples with a first number of bits;
a memory for storing the digital samples encoded with the first number of bits;
a processor that is configured to compress the ultrasound data by calculating differences between the samples and encoding the differences with a second number of bits that is less than the first number of bits; and
transmit a packet that includes the differences encoded with the second number of bits, a header portion in the packet that defines the second number of bits used to encode the differences and an overflow portion that encodes the differences that are too large to be encoded with the second number of bits;
wherein the packet includes a second header that defines a number of bits used to encode the differences that are too large to be encoded with the second number of bits.

14. An ultrasound imaging system comprising:
a transducer configured to transmit ultrasound signals into a region of interest and to receive echo signals from the region of interest;
one or more analog to digital converters configured to convert the received echo signals into corresponding digital samples with a first number of bits;
a processor that is configured to:
store digital samples of ultrasound data that are encoded with a first number of bits;
calculate differences between the digital samples;
compute a histogram of the differences between samples;
encode the differences with a second number of bits that is less than the first number of bits, wherein the second number of bits is selected as the smallest number of bits that will encode the most common difference values determined from the histogram; and
transmit a packet that includes the differences encoded with the second number of bits and an overflow portion that encodes the differences that are too large to be encoded with the second number of bits, wherein the packet includes a second header that defines a number of bits used to encode the differences that are too large to be encoded with the second number of bits.

15. The ultrasound imaging system of claim 14, wherein the processor is configured to store ultrasound data for a number of image frames.

16. The ultrasound imaging system of claim 15, wherein the processor is configured to calculate differences between lines in the same image frame.

17. The ultrasound imaging system of claim 15, wherein the processor is configured to calculate differences between data points in a single line in the same image frame.

18. The ultrasound imaging system of claim 15, wherein the processor is configured to calculate differences between the same point in different image frames.

* * * * *